United States Patent [19]

Apgar, Jr. et al.

[11] Patent Number: 5,560,662
[45] Date of Patent: Oct. 1, 1996

[54] VEHICLE BUMPER COVER

[75] Inventors: John L. Apgar, Jr., Edison; Keff I. Dank, Tenafly, both of N.J.

[73] Assignee: Boda Industries, Inc., South Hackensack, N.J.

[21] Appl. No.: 174,961

[22] Filed: Dec. 29, 1993

[51] Int. Cl.⁶ .................................................. B60R 19/44
[52] U.S. Cl. .................... 293/121; 293/108; 293/142; 293/154; 293/155
[58] Field of Search ..................... 293/107, 108, 293/110, 120–122, 154, 155, 142

[56] References Cited

U.S. PATENT DOCUMENTS

| | | | |
|---|---|---|---|
| 1,724,431 | 8/1929 | Spear | 293/107 |
| 2,624,607 | 1/1953 | Weigand | 293/143 |
| 3,056,620 | 10/1962 | Adams et al. | 293/142 |
| 3,110,516 | 11/1963 | Sukala et al. | 293/142 |
| 3,574,406 | 4/1971 | Wessells, III | 293/142 |
| 3,680,903 | 8/1972 | Hulton | 293/142 |
| 3,768,850 | 10/1973 | Barton et al. | 293/110 |
| 3,822,909 | 7/1974 | Livingstone et al. | 293/142 |
| 3,841,682 | 10/1974 | Church et al. | 293/142 |
| 4,039,215 | 8/1977 | Minhinnick | 293/142 |
| 4,055,362 | 10/1977 | Becker, III | 293/121 |
| 4,109,951 | 8/1978 | Weller | 293/144 X |
| 4,533,166 | 8/1985 | Stokes | 293/155 X |
| 4,597,601 | 7/1986 | Manning | 293/122 |

FOREIGN PATENT DOCUMENTS

| | | | |
|---|---|---|---|
| 619264 | 3/1927 | France | 293/107 |
| 69003 | 8/1958 | France | 293/121 |
| 2228372 | 1/1975 | France | 293/142 |
| 2150979 | 4/1973 | Germany | 293/120 |
| 2312815 | 9/1974 | Germany | 293/107 |
| 2708856 | 10/1977 | Germany | 293/122 |
| 219666 | 12/1924 | United Kingdom | 293/155 |
| 657996 | 10/1951 | United Kingdom | 293/120 |

Primary Examiner—Dennis H. Pedder
Attorney, Agent, or Firm—Arthur Jacob

[57] ABSTRACT

A bumper cover overlies a longitudinally extending bumper frame to establish a bumper corner in a vehicle bumper assembly and includes a unitary member of resilient elastomeric material, the member having a generally L-shaped overall configuration including a front leg extending longitudinally along the bumper frame and a side leg extending laterally relative to the bumper frame and across a corresponding end of the bumper frame, a pair of parallel splines of a relatively rigid, relatively higher strength structural material integral with the front leg of the cover member, the splines each including an engagement portion projecting from the cover member and complementary to a corresponding groove in the bumper frame for engagement with the groove to secure the spline to the bumper frame, and a securing arrangement securing the splines in the bumper cover such that by virtue of affixing the engagement portion of each spline to the bumper frame, the bumper cover is affixed to the bumper frame to complete the bumper assembly.

15 Claims, 4 Drawing Sheets

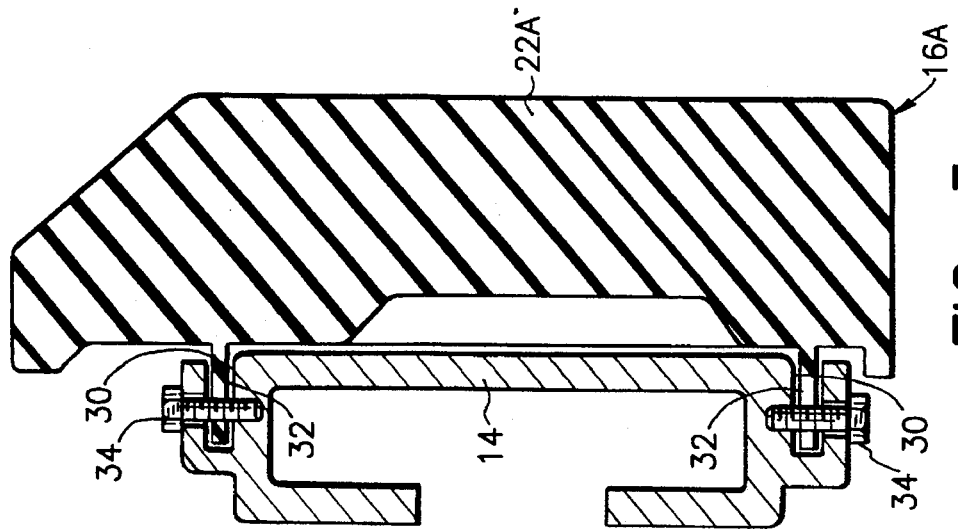
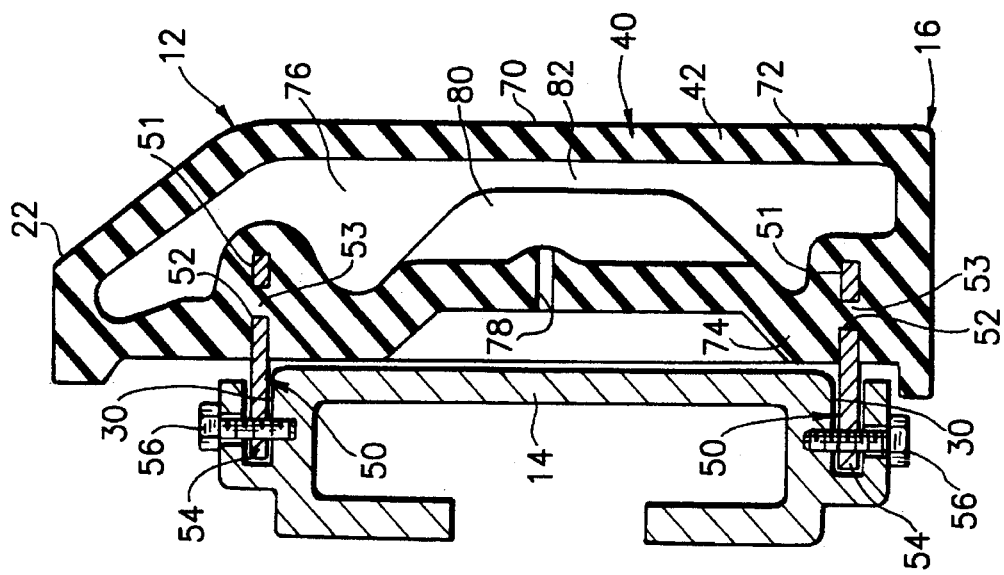

5,560,662

VEHICLE BUMPER COVER

The present invention relates generally to vehicle bumpers and pertains, more specifically, to a vehicle bumper cover for overlying a bumper frame to establish a resilient cover for a vehicle bumper assembly and, more particularly, a resilient corner in a vehicle bumper assembly.

It is quite common in vehicle bumpers to provide a construction in which a resilient cover overlies a rigid substrate in a bumper assembly. In particular, heavier vehicles, such as trucks and omnibuses, utilize a bumper frame constructed of a strong and relatively rigid structural material, such as a beam-like member of steel or aluminum, bolted or otherwise affixed to the vehicle. A resilient cover is secured to the bumper frame and is constructed to absorb forces incident upon the bumper during service of the bumper on the vehicle. One such resilient cover presently in use is constructed of three separate components which are attached to the bumper frame to cover the frame, the three components including a generally linear central cover member and two end cover members, each end cover member being curved to extend around the corresponding end of the bumper frame. Each cover member is molded of an elastomeric material, in an essentially solid construction, and includes unitary molded ribs of the same elastomeric material, which ribs are received in complementary grooves in the bumper frame for securing the cover members to the bumper frame.

During service, the cover members receive and effectively absorb impacts and other forces incident upon the vehicle bumper. In particular, the end cover members are subjected to impacts and forces in directions which tend to shear the ribs from the remainder of the end cover members, causing early failure of the securement between the end cover member and the bumper frame, with the result that the end cover members are torn from the bumper frame and require relatively frequent replacement.

The present invention provides an improved construction for a bumper cover, and especially for the end members of a bumper cover, which improved construction resists unwanted detachment from the bumper frame of a vehicle bumper assembly during service. As such, the present invention attains several objects and advantages, some of which are summarized as follows: Provides improved securement of a resilient bumper cover to a bumper frame of a vehicle for resisting detachment which otherwise might result from impacts and other forces incident upon the bumper cover during service; enables ease of assembly of the bumper cover with the bumper frame, and concomitant ease of selective detachment for replacement, if necessary; provides a bumper cover with greater effectiveness in absorbing shocks, impacts and other forces exerted upon the bumper cover during service; enables the economical manufacture and use of a bumper cover of improved performance; establishes a bumper assembly having an aesthetically pleasing appearance; provides a bumper cover which exhibits exemplary performance over a longer service life.

The above objects and advantages, as well as further objects and advantages, are attained by the present invention which may be described briefly as a bumper cover for overlying a longitudinally extending bumper frame to establish a bumper corner in a vehicle bumper assembly, the bumper frame including longitudinally opposite ends and at least one groove in the bumper frame extending longitudinally between the opposite ends, the bumper cover comprising: a unitary member of resilient elastomeric material, the member having a generally L-shaped overall configuration including a front leg for extending longitudinally along the bumper frame and a side leg for extending laterally relative to the bumper frame and across a corresponding end of the bumper frame; at least one spline of a relatively rigid, relatively higher strength structural material integral with the front leg of the cover member, the spline including an engagement portion projecting from the cover member and complementary to the groove in the bumper frame for engagement with the groove to secure the spline to the bumper frame; and securing means securing the spline in the bumper cover such that upon affixing the engagement portion of the spline to the bumper frame, the bumper cover is affixed to the bumper frame to complete the bumper assembly.

The invention will be understood more fully, while still further objects and advantages will become apparent, in the following detailed description of a preferred embodiment of the invention illustrated in the accompanying drawing, in which:

FIG. 2 is an enlarged transverse cross-sectional view of the bumper cover, taken along line 2—2 of FIG. 1;

FIG. 3 is a cross-sectional view similar to FIG. 2, but showing a prior art construction;

Figure 1:
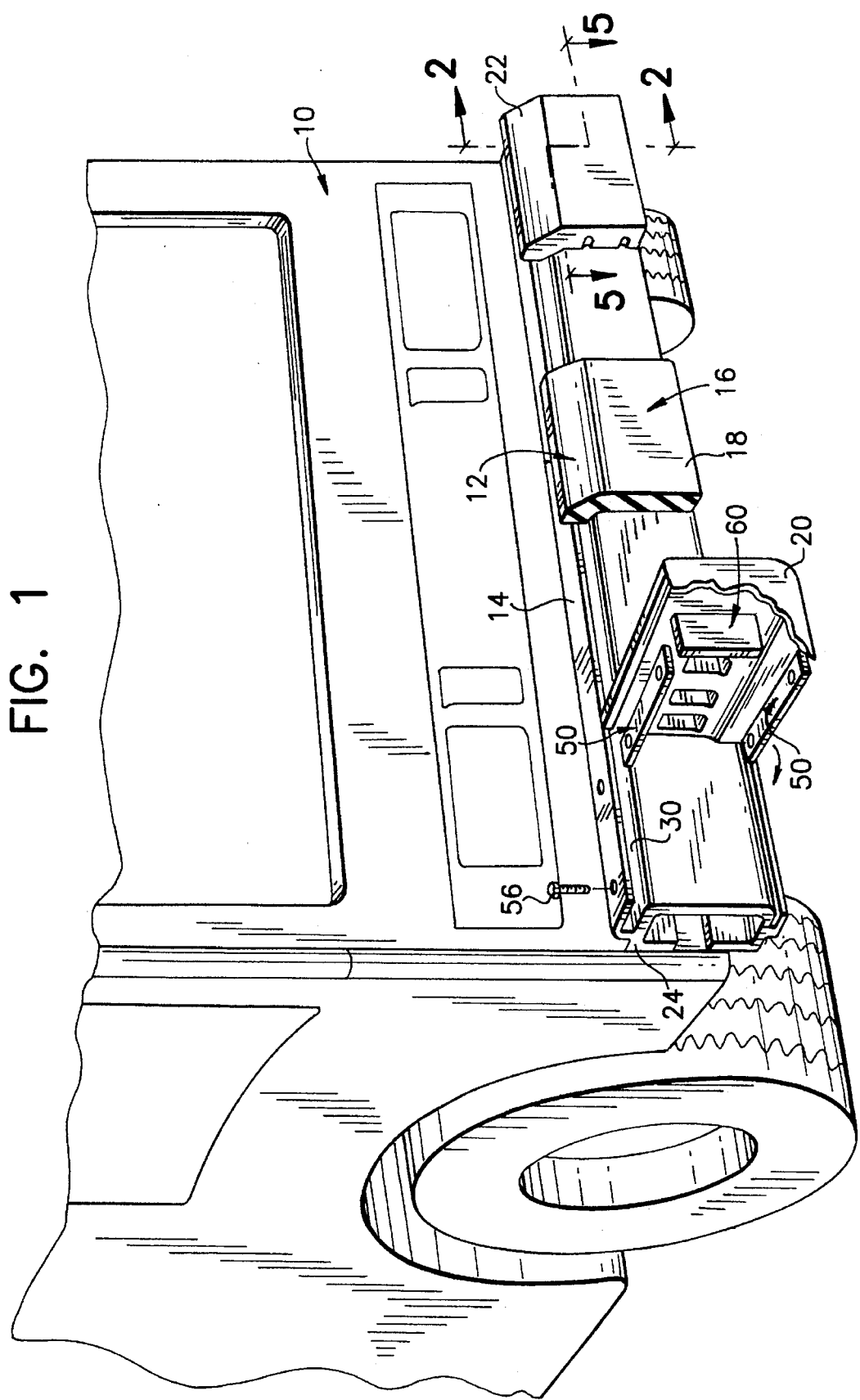
FIG. 1 is a partially diagrammatic, fragmentary pictorial view of a portion of a vehicle illustrating a bumper assembly employing a bumper cover constructed in accordance with the present invention.

Referring now to the drawing, and especially to FIG. 1 thereof, a vehicle 10 is illustrated in the form of an omnibus and is seen to include a bumper assembly 12 having a bumper frame 14 affixed to the vehicle 10, and a bumper cover 16 secured to the bumper frame 14. The bumper cover 16 is shown in the form of three distinct members, including a generally linear central cover member 18, a right end cover member 20 and a left end cover member 22. The cover members 18, 20 and 22 are constructed of an elastomeric material and are secured to the bumper frame 14, which is constructed of a relatively higher strength structural material, such as aluminum or steel. The end cover members 20 and 22 each have a generally L-shaped overall configuration so as to extend around each corresponding end 24 and 26 of the bumper frame 14, thereby covering the bumper frame 14 for protection of the bumper frame 14 against shocks, impacts and other forces directed at the bumper assembly 12 during service and for providing the bumper assembly 12 with an aesthetically pleasing appearance.

As best seen in FIGS. 2 and 3, as well as in FIG. 1, bumper frame 14 has a reinforced, generally C-shaped transverse cross-sectional configuration and includes upper and lower grooves 30 running longitudinally along the length of the bumper frame 14 from one end 24 to the other end 26 thereof. In the conventional bumper cover, depicted in FIG. 3 at 16A, the cover members, and in particular the end cover members, one of which is shown at 22A, are molded of an elastomeric material in an essentially solid construction. Securing means are provided for securing the cover members to the bumper frame 14 and are seen to include longitudinally extending ribs 32 of elastomeric material molded unitary with the cover member 16A and received within corresponding grooves 30. Fasteners, in the form of threaded screws 34, extend through the ribs 32 and into the bumper frame 14 to complete the securement of the bumper member 16A on the bumper frame 14. Experience has shown, however, that in some instances forces encountered by the cover members during service, and especially the shocks, impacts and skewed forces exerted on the end cover members, tend to sever the ribs 32 from the remainder of the cover member, thus separating the cover member from the bumper frame 14. In other instances, it has been observed that the ribs 32 become ripped in the vicinity of the screws 34, allowing the ribs 32 to be torn from the respective grooves 30 and the cover member to be separated from the bumper frame 14.

Figure 4:
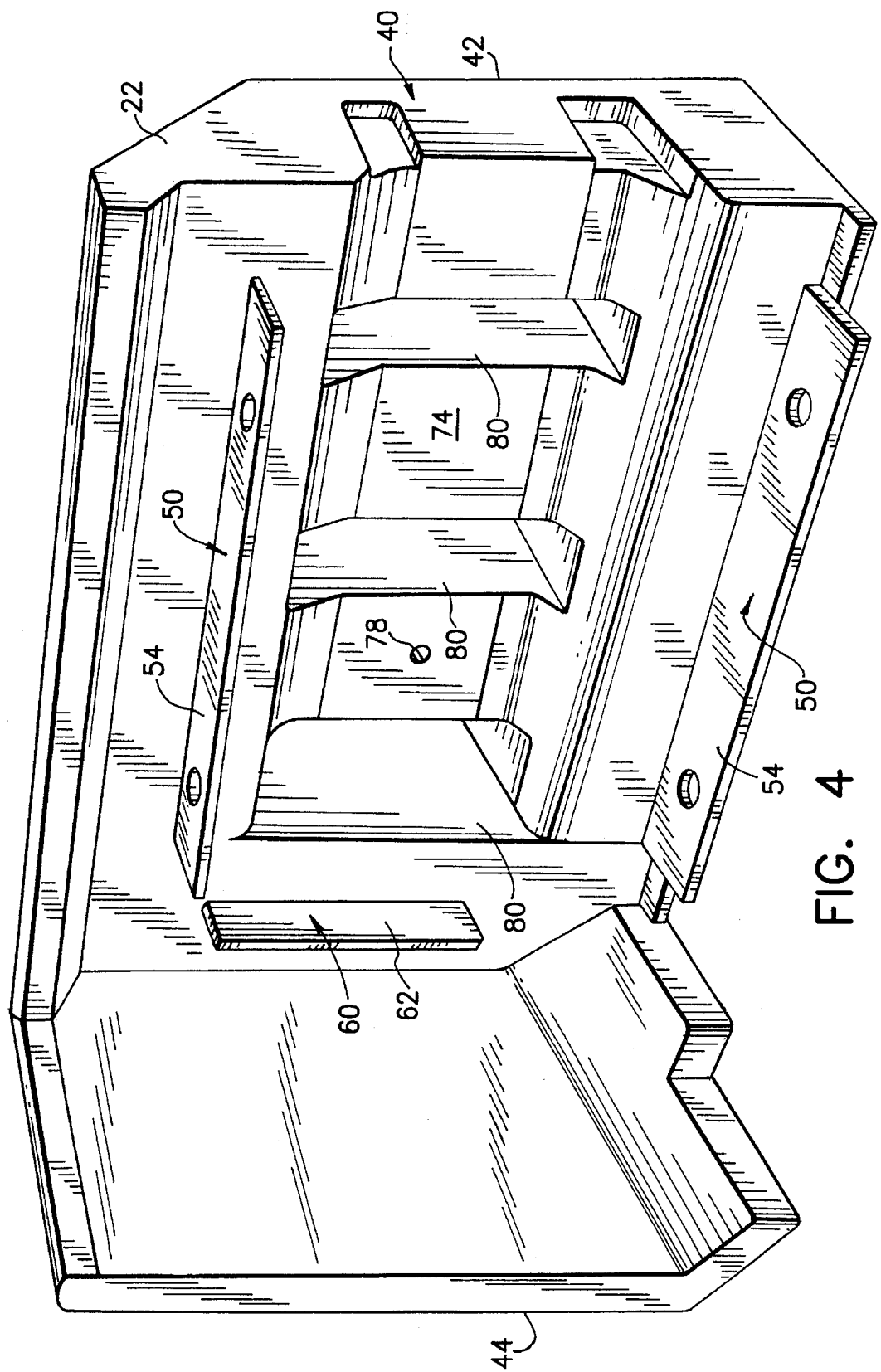
FIG. 4 is a rear perspective view of the bumper cover of the present invention.
Figure 5:
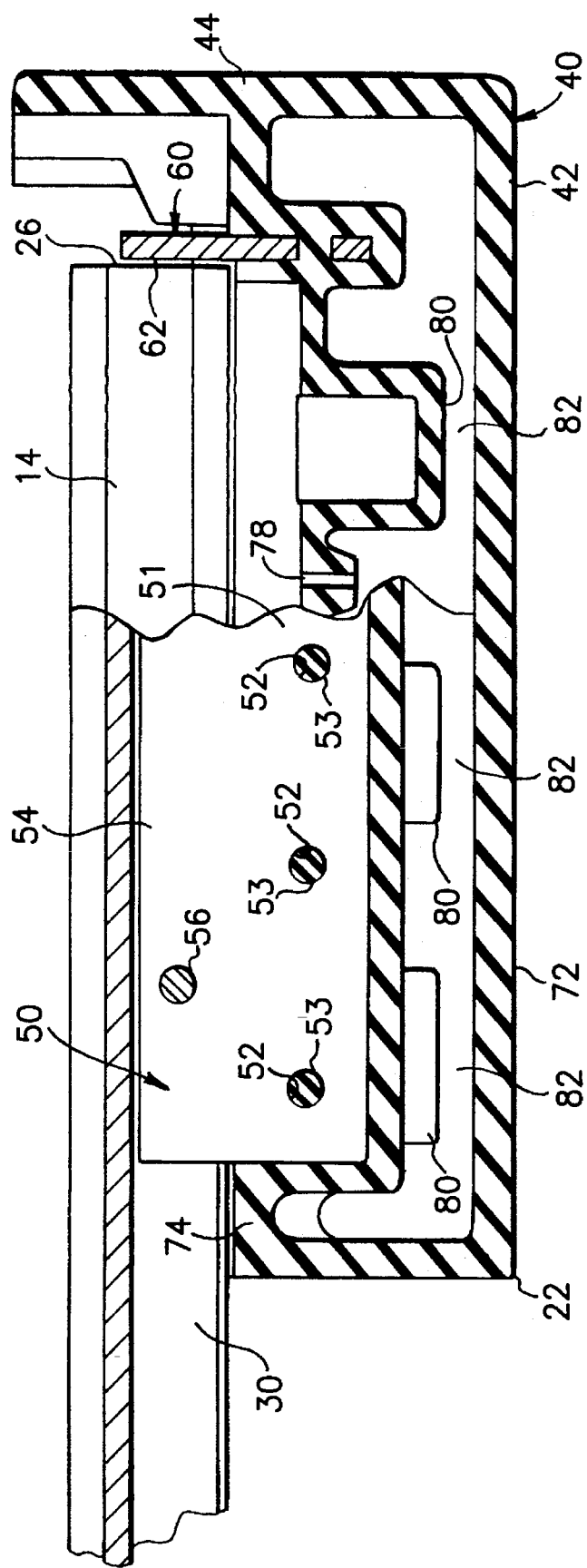
FIG. 5 is an enlarged longitudinal cross-sectional view of the bumper cover, taken along line 5—5 of FIG. 1.

The end cover member 22 of the present invention is depicted in FIGS. 2, 4 and 5 and is seen to have a more-or-less hollow construction which preferably is rotationally molded of a synthetic polymeric elastomer. Thus, the end cover member 22 includes a molded member 40 having a generally L-shaped overall configuration including a front leg 42 having a predetermined length and a side leg 44. When the end cover member 22 is placed in the bumper assembly 12, front leg 42 overlies and extends longitudinally along a longitudinal portion of the bumper frame 14, while side leg 44 extends laterally across the end 24 of the bumper frame 14.

A pair of splines 50 extend longitudinally along the front leg 42 of the end cover member 22, preferably parallel to one another, each spline 50 extending along a major portion of the predetermined length of the front leg 42 and being constructed of a structural material having a high strength and rigidity relative to the strength and rigidity of the elastomer of the molded member 40, the preferred material for the splines being steel or aluminum. The splines 50 are secured within the molded member 40 by securing means, which securing means preferably include molding the splines 50 into the member 40 during molding of the molded member 40 so as to embed a securing portion 51 of each spline 50 within the molded member 40. The securement of the splines 50 within the molded member 40 is enhanced by providing openings 52 in the securing portions 51 of the splines 50, through which openings 52 the elastomer of the molded member 40 passes, as shown at 53, so as to anchor the splines 50 in place within the molded member 40.

Each spline 50 includes an engagement portion 54 projecting from the molded member 40 the engagement portion 54 extending continuously along a major portion of the predetermined length of the front leg 42 and being generally complementary to a corresponding groove; 30 in the bumper frame 14 so that each spline 50 is received within a groove 30 to engage the groove 30 continuously along the longitudinal portion of the bumper frame 14. Fasteners, in the form of threaded screws 56, extend through the splines 50 and into the bumper frame 14 to complete the securement of the end cover member 22 on the bumper frame 14. The affixation means provided by the splines 50 and the screws 56 is not prone to severing and tearing, as described above in connection with current conventional bumper cover structures, so that the present construction better resists unwanted detachment of the end cover member 22 from the bumper frame 14.

In order to better locate the end cover member 22 upon the bumper frame 14, an end stop bar 60 is embedded within the molded member 40, in much the same manner as the affixation of the splines 50 within the molded member 40. End stop bar 60 extends laterally across the front leg 42 and includes an engagement portion 62 projecting from the molded member 40 for engaging the corresponding end 26 of the bumper frame 14 to locate the end cover member 22 in place upon the bumper frame 14. The end stop bar 60 preferably is constructed of a relatively high strength, relatively rigid structural material, such as steel or aluminum.

The rotationally molded hollow construction of the end cover member 22 serves to absorb shocks and impacts exerted upon the end cover member 22 and increases the effective service life of the end cover member 22. Thus, the outer wall 70 of the end cover member 22 includes a front wall 72 spaced from a rear wall 74, creating an inner air chamber 76 between the front wall 72 and the rear wall 74. A vent 78 in the rear wall 74 enables limited communication between the inner air chamber 76 and the ambient atmosphere for assisting in absorbing at least some of the shocks applied to the outer wall 70 during service. Rear wall 74 includes a plurality of stiffening ribs 80 molded integral with the rear wall 74 and extending toward the front wall 72 to establish a gap 82 between each rib 80 and the front wall 72. Movement of the front wall 72 toward the rear wall 74 in response to forces applied to the front wall 72 during service thus is limited to that movement permitted by the extent of the gaps 82 so that movement is controlled and excessive movement is precluded, thereby reducing to a minimum any tendency toward tearing of the front wall 72.

It will be seen that the present invention attains the objects and advantages summarized above, namely: Provides improved securement of a resilient bumper cover to a bumper frame of a vehicle for resisting detachment which otherwise might result from impacts and other forces incident upon the bumper cover during service; enables ease of assembly of the bumper cover with the bumper frame, and concomitant ease of selective detachment for replacement, if necessary; provides a bumper cover with greater effectiveness in absorbing shocks, impacts and other forces exerted upon the bumper cover during service; enables the economical manufacture and use of a bumper cover of improved performance; establishes a bumper assembly having an aesthetically pleasing appearance; provides a bumper cover which exhibits exemplary performance over a longer service life.

It is to be understood that the above detailed description of a preferred embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A bumper cover for overlying a longitudinally extending bumper frame to establish a bumper corner in a vehicle bumper assembly, the bumper frame including longitudinally opposite ends and at least one groove in the bumper frame extending longitudinally between the opposite ends, the bumper cover comprising:

a unitary member of resilient elastomeric material, the member having a generally L-shaped overall configuration including a front leg having a predetermined length for extending longitudinally along a longitudinal portion of the bumper frame and a side leg for extending laterally relative to the bumper frame and across a corresponding end portion of the bumper frame;

at least one spline of a relatively rigid, relatively higher strength structural material integral with the front leg of the cover member along a major portion of the predetermined length of the front leg, the spline including an engagement portion projecting from the cover member and complementary to the groove in the bumper frame, the engagement portion extending continuously along the major portion of the predetermined length of the front leg for engagement with the groove continuously along the longitudinal portion of the bumper frame to secure the spline to the bumper frame; and securing means securing the spline in the bumper cover, the securing means including a securing portion extending along the spline, longitudinally coextensive with the engagement portion of the spline continuously along the major portion of the predetermined length of the front leg, and embedded within the material of the cover member continuously along the major portion of the predetermined length of the front leg to integrate the spline with the bumper cover along the major portion of the predetermined length of the front leg such that upon affixing the engagement portion of the spline to the bumper frame, the bumper cover is connected and affixed to the bumper frame and is supported by the spline, both within the material of the bumper cover and within the groove in the bumper frame, continuously along the major portion of the predetermined length of the front leg to reinforce the connection between the bumper cover and the bumper frame and complete the bumper assembly.

2. The invention of claim 1 wherein the bumper frame includes two essentially parallel grooves extending longitudinally between the opposite ends and the bumper cover includes two essentially parallel splines of a relatively rigid, relatively higher strength structural material integral with the front leg of the cover member along the major portion of the predetermined length of the front leg, each spline including an engagement portion projecting from the cover member and complementary to the corresponding groove in the bumper frame, each engagement portion extending continuously along the major portion of the predetermined length of the front leg for engagement with the corresponding groove continuously along the longitudinal portion of the bumper frame to secure each spline to the bumper frame.

3. The invention of claim 2 including an end stop bar of a relatively rigid, relatively high strength structural material integral with the cover member, the end stop bar including an engagement portion projecting from the cover member and extending laterally relative to the front leg for abutment with the corresponding end of the bumper frame when the splines are engaged with the grooves of the bumper frame.

4. The invention of claim 1 wherein the securing means includes openings in the spline along the securing portion, and portions of the material of the cover member passing through the openings to anchor the securing portion of the spline within the cover member.

5. The invention of claim 1 wherein the cover member is essentially hollow and includes an outer wall surrounding an inner chamber, the cover member including a vent in the outer wall, the vent enabling limited communication between the inner chamber and the surrounding atmosphere for assisting in absorbing at least some of the shocks applied to the outer wall during service.

6. The invention of claim 5 wherein the outer wall includes a front wall portion extending along the front leg, and a rear wall portion juxtaposed with and spaced from the front wall portion, and the rear wall portion includes a plurality of ribs extending from the rear wall portion toward the front wall portion and spaced from the front wall portion for limiting movement of the front wall portion toward the rear wall portion in response to forces applied to the front wall portion during service.

7. The invention of claim 6 wherein the securing portion of the spline is embedded within the rear wall portion, and the securing means includes openings in the spline along the securing portion, with portions of the material of the cover member passing through the openings to anchor the securing portion of the spline within the cover member.

8. The invention of claim 1 wherein the cover member is rotationally molded of a synthetic polymeric material.

9. A bumper cover for overlying a longitudinally extending bumper frame to establish a bumper corner in a vehicle bumper assembly, the bumper frame including longitudinally opposite ends and at least one groove in the bumper frame extending longitudinally between the opposite ends, the bumper cover comprising:

a unitary member of resilient elastomeric material having a predetermined length for extending longitudinally along a longitudinal portion of the bumper frame;

at least one spline of a relatively rigid, relatively higher strength structural material integral with the cover member along a major portion of the predetermined length of the unitary member, the spline including an engagement portion projecting from the cover member and complementary to the groove in the bumper frame, the engagement portion extending continuously along the major portion of the predetermined length of the unitary member for engagement with the groove continuously along the longitudinal portion of the bumper frame to secure the spline to the bumper frame; and securing means securing the spline in the bumper cover, the securing means including a securing portion extending along the spline, longitudinally coextensive with the engagement portion of the spline continuously along the major portion of the predetermined length of the front leg, and embedded within the material of the cover member continuously along the major portion of the predetermined length of the front leg to integrate the spline with the bumper cover along the major portion of the predetermined length of the front leg, such that upon affixing the engagement portion of the spline to the bumper frame, the bumper cover is connected and affixed to the bumper frame and is supported by the spline, both within the material of the bumper cover and within the groove in the bumper frame, continuously along the major portion of the predetermined length of the front leg to reinforce the connection between the bumper cover and the bumper frame and complete the bumper assembly.

10. The invention of claim 9 wherein the bumper frame includes two essentially parallel grooves extending longitudinally between the opposite ends and the bumper cover includes two essentially parallel splines of a relatively rigid, relatively higher strength structural material integral with the cover member along the major portion of the predetermined length of the unitary member of elastomeric material, each spline including an engagement portion projecting from the cover member and complementary to the corresponding groove in the bumper frame, each engagement portion extending continuously along the major portion of the predetermined length of the unitary member of elastomeric material for engagement with the corresponding groove continuously along the longitudinal portion of the bumper frame to secure each spline to the bumper frame.

11. The invention of claim 9 wherein the securing means openings in the spline along the securing portion, and portions of the material of the cover member passing through the openings to anchor the securing portion of the spline within the cover member.

12. The invention of claim 9 wherein the cover member is essentially hollow and includes an outer wall surrounding an inner chamber, the cover member including a vent in the outer wall, the vent enabling limited communication between the inner chamber and the surrounding atmosphere for assisting in absorbing at least some of the shocks applied to the outer wall during service.

13. The invention of claim 12 wherein the outer wall includes a front wall portion extending along the cover member, and a rear wall portion juxtaposed with and spaced from the front wall portion, and the rear wall portion includes a plurality of ribs extending from the rear wall portion toward the front wall portion and spaced from the front wall portion for limiting movement of the front wall portion toward the rear wall portion in response to forces applied to the front wall portion during service.

14. The invention of claim 13 wherein the securing portion of the spline is embedded within the rear wall portion, and the securing means includes openings in the spline along the securing portion, with portions of the material of the cover member passing through the openings to anchor the securing portion of the spline within the cover member.

15. The invention of claim 9 wherein the cover member is rotationally molded of a synthetic polymeric material.

* * * * *